Figure 4:
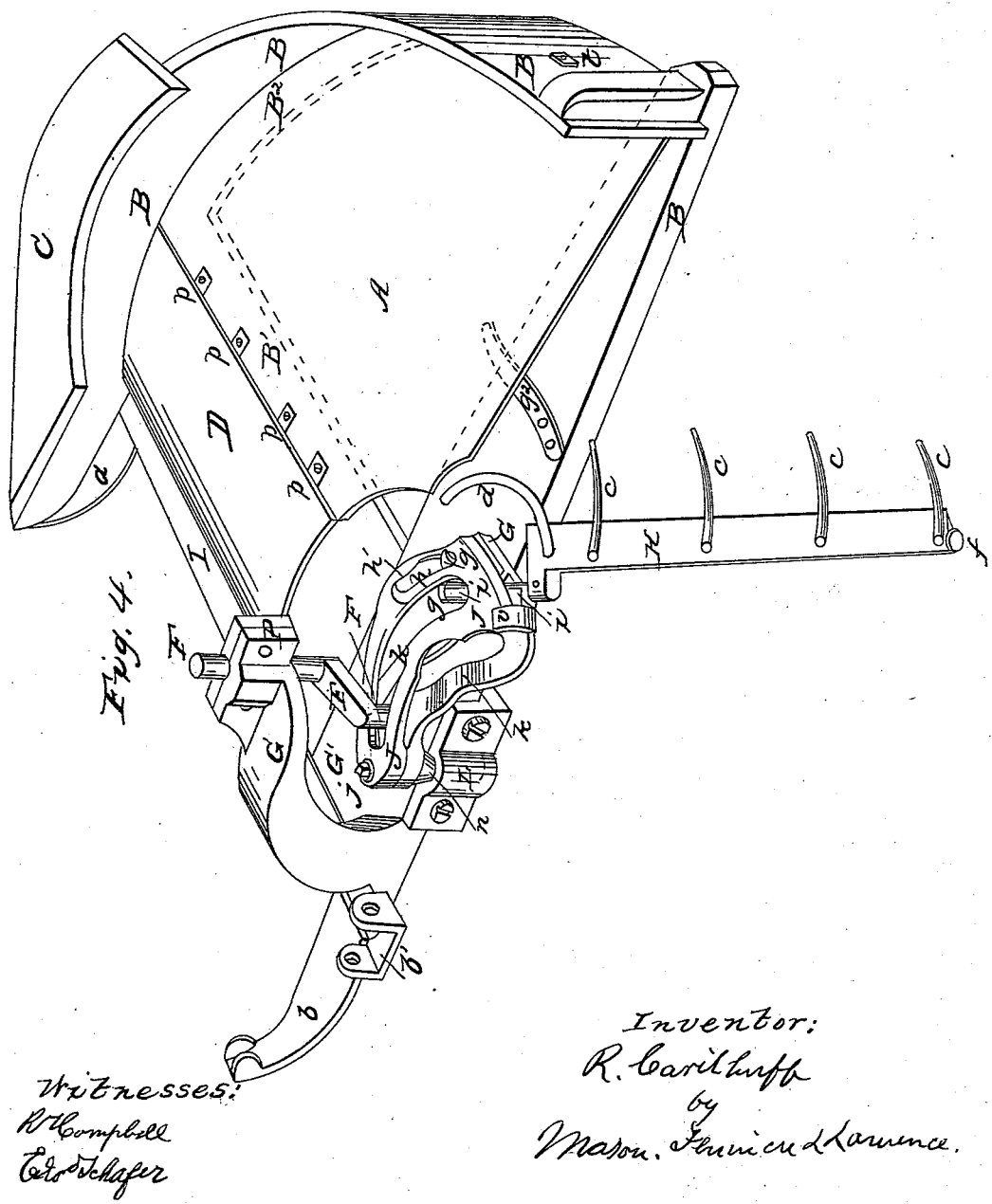

R. CARKHUFF.
Harvester Rake.
No. 84,857. 2 Sheets—Sheet 1.
Patented Dec. 15, 1868.
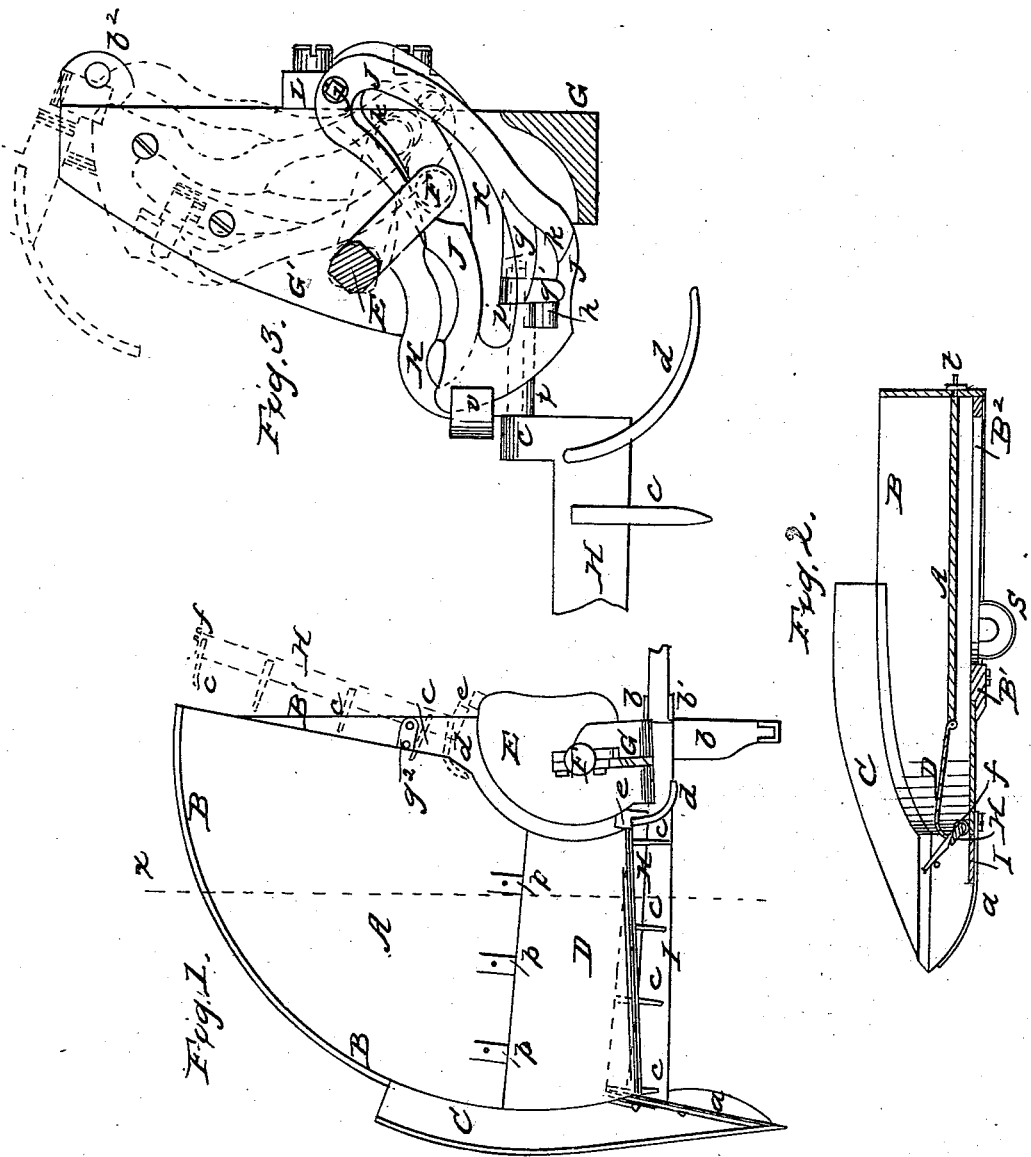

R. CARKHUFF.
Harvester Rake.

No. 84,857.

2 Sheets—Sheet 2.

Patented Dec. 15, 1868.

Witnesses:
R. H. Campbell
Edw. Schafer

Inventor:
R. Carkhuff
by
Mason, Fenwick and Lawrence.

UNITED STATES PATENT OFFICE.

R. CARKHUFF, OF LEWISBURG, PENNSYLVANIA, ASSIGNOR TO HIMSELF AND T. H. WILSON, OF SAME PLACE.

IMPROVEMENT IN HARVESTER-RAKES.

Specification forming part of Letters Patent No. 84,857, dated December 15, 1868; antedated December 3, 1868.

*To all whom it may concern:*

Be it known that I, R. CARKHUFF, of Lewisburg, in the county of Union and State of Pennsylvania, have invented a new and useful Improvement on Raking Attachments for Reapers; and I do hereby declare that the following is a full, clear, and exact description thereof, reference being had to the accompanying drawings, making a part of this specification, in which—

Figure 1, Sheet 1, is a top view of the raking attachment, showing the rake in two positions. Fig. 2, Sheet 1, is a longitudinal sectional view taken through the grain-receiver and its frame, in the vertical plane indicated by red line $x\,x$ in Fig. 1. Fig. 3, Sheet 1, is an enlarged top view, in detail, of the double cams and other devices for giving the required movements to the rake. Fig. 4, Sheet 2, is a perspective view, looking toward the outer side of the grain-receiver, showing the rake in a position about to pass forward beneath the grain-receiver after delivering its gavel.

Similar letters of reference indicate corresponding parts in the several figures.

This invention relates to certain novel improvements on that class of raking attachments for reaping-machines wherein a segment platform or grain-receiver is employed, in conjunction with a rake, which receives a vibrating motion and also a rocking motion, and delivers the grain upon the ground in gavels from the rear inner side of said platform.

The object of my invention is to cause a vibrating rake or clearer, in its forward strokes, to sweep beneath the grain receiver or platform, out of the way of the grain falling thereupon, and then to sweep over said platform in its backward raking strokes, and deliver the cut grain in gavels from the rear inner side thereof, said rake being so constructed and operated that its teeth will be turned down in a plane parallel to the plane of the platform at the termination of its backward strokes, so as to occupy very little vertical space beneath the platform, as will be hereinafter described.

The invention further consists in a segment platform or grain-receiver, which is suspended at its rear outer edge from the rear grain-guard, and which is provided with a front hinged section, in combination with a vibrating rake-clearer, which shall revolve around said platform in its forward and backward strokes, as will be hereinafter explained.

To enable others skilled in the art to understand my invention, I will describe its construction and operation.

In the accompanying drawings, $B^1\,B^1$ represent two beams, which are framed together at right angles to each other, and united at their outer extremities by means of a segment, $B^2$, so as to form a substantial frame for a segmental platform or grain-receiver, A D, as clearly shown in Fig. 4. B represents the curved grain guard or fender, which is suitably secured to the rear and outer curved beam, $B^2$, and provided with the inclined guard and outer divider, C.

The finger-bar I is secured along the front edge of the transverse beam $B^1$, and suitably bolted to a casting, $G'$, which is at the inner front corner of the platform-frame.

At the outer forward corner of the platform-frame is a shoe, $a$, and also a small supporting-wheel, S, which latter supports the outer end of the said frame upon the ground.

At the inner front corner of the platform-frame is the inner divider, $b$, and also ear-pieces $b^1\,b^1$, to which latter a bar or brace leading from the draft-frame may be pivoted; and in rear of these ears $b^1$ is an ear, $b^2$, which serves as an attachment for the rear brace to said platform-frame.

The platform-frame thus described may be attached to a single or double wheel draft-frame either by a flexible joint or joints, or by a rigid connection in any of the well-known modes.

A represents the rear main portion of the grain-platform, which is secured rigidly at its rear curved edge to the guard-board B by means of nuts and screw-fastenings $t$, or in any other suitable manner, and which is sustained forward of such attachment by means of a flat spring, $g^2$. (Shown in Fig. 4.) This spring is secured to the longitudinal beam $B^1$ of the platform-frame, but is not secured to the platform, for a reason which will be hereinafter explained.

To the front edge of the overhanging platform A a section, D, is hinged at $pp$, which section extends forward and rests, at its front downwardly-curved end, upon the transverse beam $B^1$ of the platform-frame, just in rear of the finger-bar I. This hinged section forms the front part of the platform or grain-receiver, and is designed to prevent straw from working backward beneath the platform, in the space which is between it and its frame $B^1$.

The casting $G'$, which forms a front extension of the longitudinal frame-beam $B^1$, or support or brace thereto, is constructed with an overhanging standard, G, upon it, which rises from the front inner corner of the plate $G'$ and extends backward, and has a journal-box, P, formed upon it, for receiving the perpendicular driving-shaft F of the rake, as clearly shown in Fig. 4. This perpendicular shaft F carries on its lower end a crank-arm, $F^1$, which has a stud, $F^2$, on its lower end, that plays in curved slots, which are made through two segmental plates, J K, as shown in Fig. 4.

The lower segmental plate, K, vibrating in a plane parallel to the plane of the platform $A'$ and its vertical stud $n$, has its bearing in a journal-box, L, on the inner edge of plate G. (Shown in Fig. 4.) On the outer free end of this plate K is a tubular bearing, $i$, through which a short rocking shaft, $g$, passes, and is held by a nut on the end. This shaft $g$ is formed on the inner right-angular end, $e$, of the rake-head H, as shown in Figs. 3 and 4, and serves to connect this rake-head to the plate K, so that the former can rock or roll independently of the latter.

The rake-head H may be provided with teeth $c$, or, if desirable, these teeth may be dispensed with. At its outer end is a small roller, $f$, which supports this end upon the curved beam $B^2$ during the forward sweep of this head beneath the platform A and section D.

At the inner front corner of the rake-head H is a curved lifting-arm, $d$, which is designed for lifting the front end of the hinged section D as the rake passes out from beneath this section to commence its raking stroke over the platform.

The rake-head is attached, by its rocking shaft $g$, to the vibrating plate K in such manner that it will always be radial, or nearly so, to the center of the circle of which the platform is a segment.

The upper plate, J, is pivoted, by a pin, $j$, to the front end of the lower plate, K, so that the upper plate will be allowed to have a slight vibration independent of the plate K, for the purpose of rocking the rake-head about its pivotal connection with this plate K. The short shaft $g$ of the rake-head has a tongue, $g^1$, secured fast to it, which tongue projects through a short slot, $h$, through plate J, which slot is partially covered by an overhanging portion, $h'$. (Shown in Figs. 3 and 4.) The outer free end of plate J is held down in place upon the plate K by means of a lip, $v$, which is formed on the latter.

When the rake-head is sweeping backward over the platform, its teeth are held perpendicularly thereto by means of the portion $h'$ and tongue $g^1$, and when the rake-head reaches the termination of its backward stroke the stud $F^2$ will operate upon the cone-shaped edges of the slots of plates J K, so as to cause the plate K to move the tongue $g^1$ back of the holding portion $h'$, and thus bring the rake-head and teeth in a plane parallel to the platform, and beneath the plane of the latter, as indicated in red in Fig. 1, and also represented in Fig. 4. The rake is then moved forward beneath the platform A and hinged section D, and as it leaves the front edge of this section the two plates J K are moved so as to bring this rake-head in a position perpendicular to the plane of the platform and over the section D.

The plate J and tongue-piece $g^1$ serve as a means for holding the rake-head in raking position while sweeping over the platform, and also for holding it out of raking position while returning beneath the platform to commence another raking stroke.

The outer end of the rake-head is supported by its wheel $f$ upon the platform while sweeping over it, and upon the curved beam $B^2$ while sweeping beneath it.

The front end of the hinged section D is lifted by arm $d$, and falls by its own weight when the rake-head passes from beneath it.

The shaft F has a continuous rotating motion, and may be driven from the main driving wheel or wheels of a draft-frame by any suitable means.

In Fig. 1, E represents a guard, which covers and protects the rake-moving devices, it being shaped so as to fit around the standard or support, and also form a continuation of the platform.

Having described my invention, what I claim as new, and desire to secure by Letters Patent, is—

1. The combination of a vibrating and rocking rake-head, vertical crank-shaft, independently-moving cam-plates, segment-platform frame, and an overhanging grain-receiver, with or without the hinged front section D, substantially as described.

2. The slotted plates J K, constructed and pivoted substantially as shown and described, so as to vibrate and rock the rake-head, as set forth.

3. The arm $d$, for lifting the section D of the grain-receiver, arranged on the rake-head, substantially as described.

4. The spring $g^2$, sustaining the overhanging segmental grain-receiver A, forward of its rear point of attachment, without interfering with the passage of the rake beneath the said receiver, substantially as described.

5. The combination of the overhanging standard G of plate $G'$, crank-shaft F, and slotted cam-plates J K, substantially as described.

6. Rocking the rake-head by means of a movement in the plate J, independent of the moving plate K, through the agency of the tongue $g^1$ and slot $h$, substantially as described.

7. The guard E, constructed and applied substantially as described, in combination with standard and platform, for protecting the rake-moving devices, substantially as described.

8. The construction of the support G' G' P, for the rake-moving devices, and for the finger-beam and inner side beam, substantially as described, so that the raking attachment may be applied to the inner front corner of the platform, as set forth.

9. A rocking rake-head applied to and operated by independently-movable vibrating cam-plates, controlled and operated by a crank-shaft, F, substantially as described.

R. CARKHUFF.

Witnesses:
L. F. ALBRIGHT,
WM. JONES.